Feb. 9, 1932.  H. M. DAVIS  1,844,564
AVERAGING APPLIANCE
Filed Feb. 5, 1930  2 Sheets-Sheet 1

Inventor
Hollie McVey Davis
By Clarence A. O'Brien
Attorney

Feb. 9, 1932. H. M. DAVIS 1,844,564
AVERAGING APPLIANCE
Filed Feb. 5, 1930 2 Sheets-Sheet 2
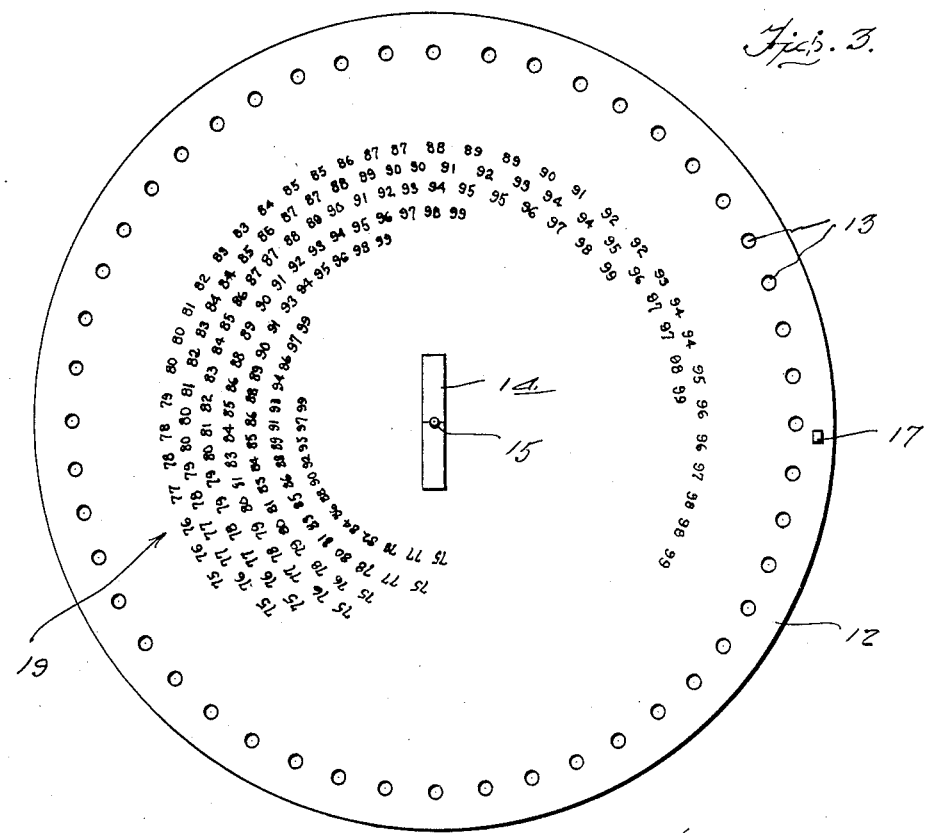
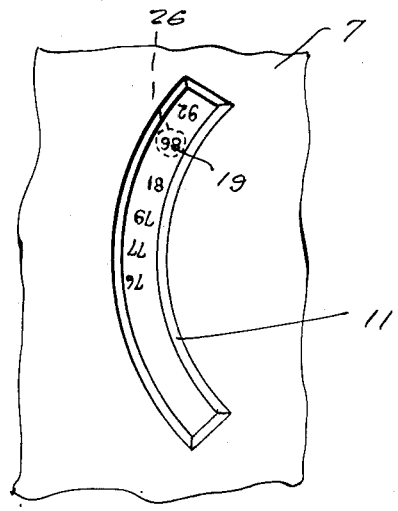
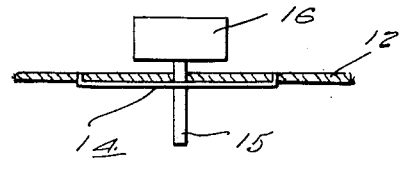
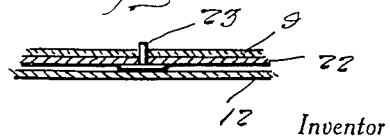
Inventor
Hollie McVey Davis
By Clarence A. O'Brien
Attorney Patented Feb. 9, 1932

1,844,564

UNITED STATES PATENT OFFICE

HOLLIE M. DAVIS, OF MORRIS, MINNESOTA

AVERAGING APPLIANCE

Application filed February 5, 1930. Serial No. 426,096.

This invention relates to an improved appliance which is especially adapted for school use by teachers, assistants, and pupils for readily calculating the average mark obtained by a pupil in a given number of subjects.

It is a matter of common knowledge that in present day grade markings, five primary letters are employed to represent the grade marks of the students and pupils. For instance, the letter "A" is a mark above average. The letter "B" is acknowledged as average; "C" is below average; "D" is deficient; and, "F" failure.

These letter markings are generally employed on report cards. In some instances however, marks are determined through numerical percentage; for instance, 98 per cent for "A", 90 per cent and below for "B" and so on.

In carrying the inventive conception of the present discovery into practice, I have evolved and produced a simple and efficient mechanical appliance susceptible of accurate and easy manipulation, wherein I employ letter marks, and percentage marks, co-related in such a manner as to enable the teacher to determine an average of five or six marks, for instance, indicating the final average of all subjects as a unit.

In developing this idea, I rely upon a rather flexible scale of percentage marks and letters arranged in a more or less arbitrary manner so that the teacher or the student may readily calculate the average of all of his marks for a given period of time.

By way of illustration, it is obvious that if a student has three D's, two C's, two B's and one A, the average of these eight subjects would give him a passing mark, for example, "C".

Additional preliminary explanation is waived at this point in the description to introduce the figures of the device employed for accomplishing this result.

Figure 3 is a bottom plan view of the reverse side of a rotary indicia dial.

Figure 4 is a bottom plan view of a fragmentary portion of the base.

Figure 5 is a detail sectional and elevational view showing the turning knob for the dial.

Figure 6 is a similar view showing the pivot point of a segmental indicator constituting an important factor of the invention.

Figure 2:
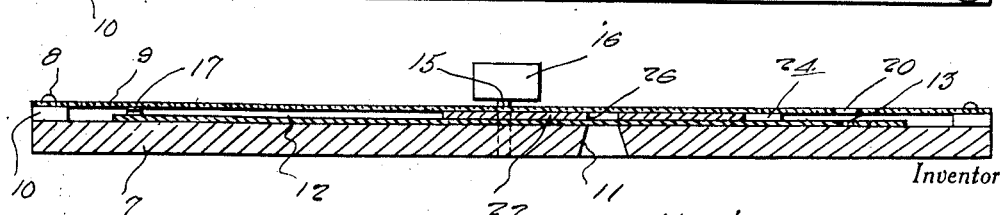
Figure 2 is a section taken approximately on the plane of the line 2—2 of Figure 1.

Referring now to Figure 2, it will be seen that the reference character 7 designates a base. This is in the nature of a wooden block which is throughout nine or ten inches along its edge, being rectangular in general configuration. Secured by suitable fasteners 8 to the corners thereof is a transparent cover 9. This rests on washers 10 so that it is spaced above the top of the base board. The cover may be celluloid or analogous material. It corresponds in size and shape with the base.

The base is formed at a predetermined point with an arcuate sight slot 11. This functions in a manner to be hereinafter described. The operating mechanism is between the base and the cover sheet 9. The primary part is distinguished as a dial and is represented by the numeral 12. It is in the nature of a disc of suitable material and proportion. It is formed around its marginal portion with circumferentially spaced holes 13. It is secured by cleats 14 to a turning shaft 15 journalled for rotation in an appropriate bearing in the base.

A knob 16 is fastened to the shaft and serves to bodily rotate the dial. The dial is provided with a peripheral clip as at 17. In addition, it is formed on its obverse face with a field of letter indicia generally designated by the numeral 18. This field includes groups of the aforesaid letters A, B, C, D, and F. They are arranged at circumferentially spaced points in circular rows substantially concentric to the axis of rotation of the dial.

On the reverse side of the dial is a field of numerals designated by the numeral 19. These are the numerical percentage marks and they correspond in value to the letters 18 on the obverse face of the disc. The holes 13 come into alinement with a slot 20 formed in the cover 9 and this slot is of a length to fulfill the purpose of the represented characters, A, B, C, D and F which constitutes primary starting points for the dial.

The characters 21 are spaced apart to correspond with the holes 13. In other words, in any position of the dial 12, the holes 13 register with the characters 21. The purpose of this will become clear as the description proceeds.

Figure 1:
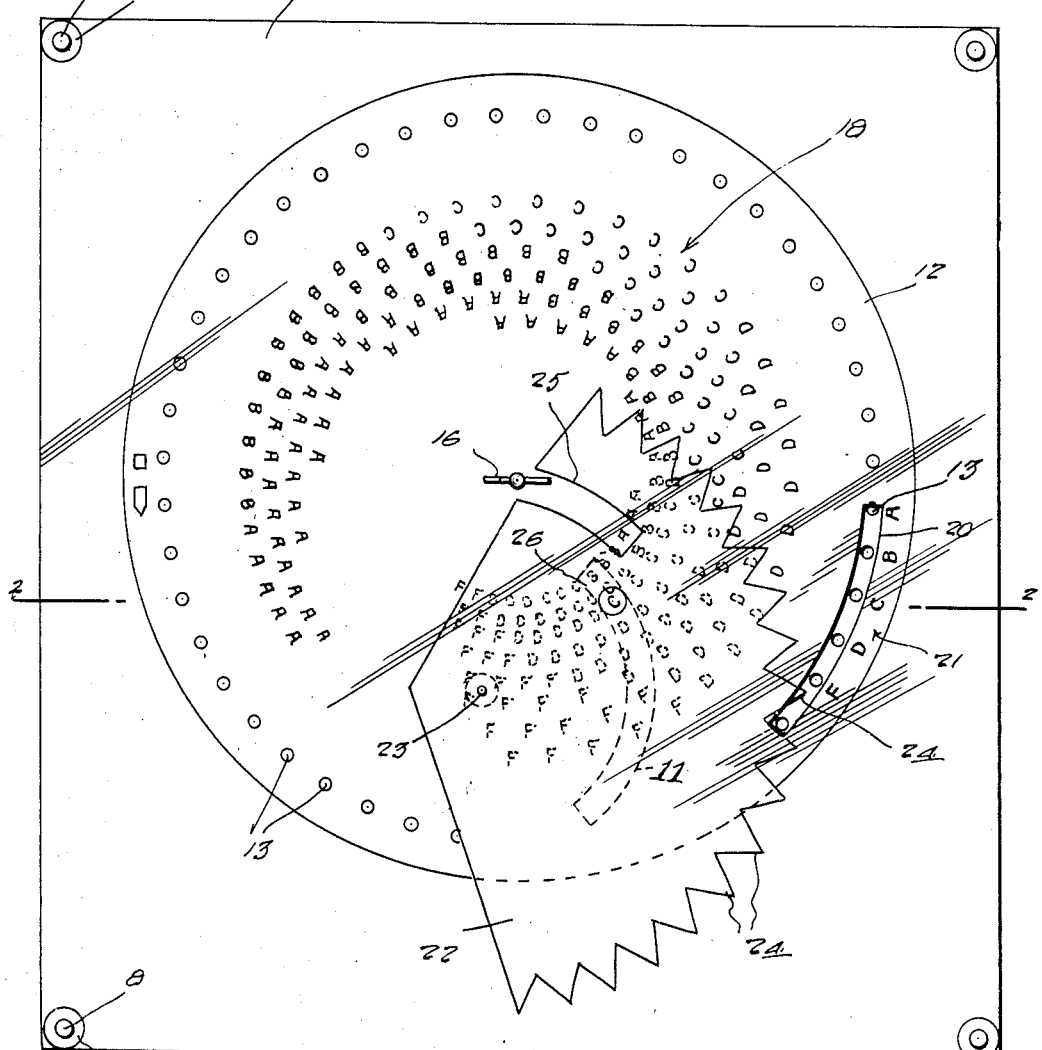
Figure 1 is a top plan view of the complete appliance constructed in accordance with the invention.

The reference character 22 designates generally a swingably mounted indicator which is superimposed on the dial and which is mounted for swinging about the pivot point 23. This point 23 is eccentric to the axis of rotation of the dial. The indicator is of segmental configuration and is provided with marginal teeth 24 located to swing one-by-one across the left hand end of the aforesaid slot 20 as seen in Figure 1.

These teeth are struck by a suitable instrument in a step-by-step manner to turn or feed the indicator in a similar step-by-step manner in a direction from the center toward the periphery of the dial. The slot 25 in the indicator is merely for clearance of the shaft 15 of the dial. An important feature of this indicator is the sight opening 26. This is utilized to expose the letter characters 18 on the dial as the dial is turned and as the indicator is simultaneously swung in a limited arc.

It is to be noted that this hole or opening 26 is directly over the aforesaid slot 11 and it swings from the right hand or inner end of the slot to the opposite end thereof. Thus it will be observed that the slot is concentric to the pivot 23. Likewise, the hole 26 swings in a path which is concentric to this same pivot 23. Incidentally, the letter characters of the field 18 move across the slot 11 in a predetermined successive manner and these characters are exposed through the hole 26 in appropriate sequence.

In accordance with the principle upon which the finding of the final average mark is determined, I have found it expedient to couple numerical figures with the alphabetical letters. For example, A equals 4, B equals 3, C equals 2, D equals 1 and F equals 0. The following example with the foregoing in mind will show how the appliance is manipulated.

First, turn the knob 16 in a direction from left to right in Figure 1 (counter-clockwise). This will bring the clip 17 into engagement with the adjacent edge of the segmental indicator 22. Then the indicator and the dial will swing as a unit until the end of the slot 25 strikes the pivot post 15. The device is now set for calculation. For example, to find the average of A plus A plus D, (4 plus 4 plus 1), place a pencil point in the hole 13 opposite the character A (see the series 21 in Fig. 1). Then turn the disc with the pencil clockwise as far as it will go. The pencil swings from the right hand end of the slot 20 to the left hand end and while it is swinging, it will engage the tooth 24 located in the slot and will swing the indicator around one step.

Now, take the pencil back and place it in the hole 13 then opposite A on the scale 21 and repeat the operation. Again, the indicator 22 will swing one more step. Next, place the pencil point in the hole 13 opposite D and repeat the same operation for D. During this time the hole 26 will have moved to a point to expose B in the field of characters designated generally by the reference character 18. B is the average of A plus A plus D (4 plus 4 plus 1) equals 9, divided by three, equals three.

Three in turn is equivalent of the mark B. Now if another credit is to be added, say F, the average of four grades or marks will be given. In this case, the letter C will appear through the hole 26 as shown in Figure 1 of the drawings.

If it is desired to ascertain what percentage C provides in this group of marks, it is necessary to turn the base 7 so that the bottom faces the user. Then the arcuate slot 11 will be visible. Then by holding the hole 26 to a light, for instance the window light or an electric light, the percentage of 86 (see Figure 4) will be shown. Incidently, the numerals 19 are regulated to correspond in value to the letter marking 18 on the obverse side of the dial. The dial is substantially transparent in itself and the shaft of light will show through the hole 26 and slot 11 to expose this numerical percentage mark.

Each average letter thus produced has its corresponding mark which is visible by placing the slot before a light, as described.

Another example may be where the pupil had three D's, two C's, two B's and one A. The average of these eight grades will give an average mark of C. This may be proved by dividing the number of subjects 8, into 1 plus 1 plus 1 plus 2 plus 2 plus 3, plus 3, plus 4 which gives the answer 17/8=2 and 1/8 or approximately 2 or C.

Through the use of this device, the teacher may readily ascertain from any report card, by determining the number of subjects and the grade marks, what the average mark of the total grade marks happens to be.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In an averaging appliance of the class described, a support, charted means on said support adapted to be manually movable in an intermittent manner, an indicator mounted on said means for operation in a step-by-step manner, and arranged for simultaneous movement with said means when the latter has travelled a predetermined distance, said indicator being cooperable with the charted indicia on said means to expose a predetermined mark on the means.

2. In a mark appliance of the class described, in combination, a base, a transparent cover fastened to said base in spaced parallelism above the top face thereof, said cover plate being provided at a predetermined point with an arcuate slot of a limited length and having spaced letters along one edge thereof constituting an index scale, a dial mounted for rotation on said base and underneath said cover plate and having its obverse face formed with a field of grade marking letters arranged in a predetermined sequential order, the marginal portion of said dial being formed with circumferentially spaced holes movable into registry with said slot and further into alinement with the letters of said index scale to adapt them for reception of a pencil point utilized in moving the dial about its pivot with respect to said cover and slot, a segmental indicator superimposed upon the obverse face of said dial and having eccentric pivotal connection with said cover, the marginal edge of said indicator being serrated to provide teeth and said teeth being successively movable into one end portion of said slot, said indicator being provided with a sight opening for exposing predetermined letters in said field as the dial is rotated.

In testimony whereof I affix my signature.

HOLLIE M. DAVIS.